US008863193B2

(12) United States Patent
Kikuchi et al.

(10) Patent No.: US 8,863,193 B2
(45) Date of Patent: Oct. 14, 2014

(54) INFORMATION PROCESSING APPARATUS, BROADCAST RECEIVING APPARATUS AND INFORMATION PROCESSING METHOD

(75) Inventors: Maasaki Kikuchi, Akishima (JP); Yoshihiro Ohmori, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 161 days.

(21) Appl. No.: 13/328,160

(22) Filed: Dec. 16, 2011

(65) Prior Publication Data
US 2012/0222079 A1  Aug. 30, 2012

(30) Foreign Application Priority Data

Feb. 28, 2011  (JP) ................................. 2011-042473

(51) Int. Cl.
*G06F 3/00* (2006.01)
*H04N 21/462* (2011.01)
*H04N 21/434* (2011.01)
*H04N 21/488* (2011.01)
*H04N 21/4722* (2011.01)

(52) U.S. Cl.
CPC ....... *H04N 21/4345* (2013.01); *H04N 21/4622* (2013.01); *H04N 21/488* (2013.01); *H04N 21/4722* (2013.01)
USPC .................. 725/50; 725/39; 725/48; 725/49; 725/51; 725/40

(58) Field of Classification Search
USPC .................................................. 725/48–51
See application file for complete search history.

(56) References Cited

U.S. PATENT DOCUMENTS

| 5,828,945 | A | * | 10/1998 | Klosterman | 455/42 |
| 7,152,236 | B1 | * | 12/2006 | Wugofski et al. | 725/40 |
| 7,716,702 | B2 | * | 5/2010 | Helms | 725/41 |
| 2002/0029387 | A1 | | 3/2002 | Nishikawa | |
| 2003/0051246 | A1 | * | 3/2003 | Wilder et al. | 725/49 |

FOREIGN PATENT DOCUMENTS

| JP | 2001-189895 | | 7/2001 |
| JP | 2003-339040 | A | 11/2003 |
| JP | 2005-333405 | | 12/2005 |
| JP | 2006-067374 | A | 3/2006 |
| JP | 2007-081993 | A | 3/2007 |

OTHER PUBLICATIONS

Japanese Office Action dated Mar. 13, 2012 for Japanese Application No. 2011-042473 filed on Feb. 28, 2011.

* cited by examiner

*Primary Examiner* — Jun Fei Zhong
(74) *Attorney, Agent, or Firm* — Knobbe, Martens, Olson & Bear LLP (57) ABSTRACT

According to one embodiment, an information processing apparatus includes a first receiver, a second receiver, an extractor and a display module. The first receiver is configured to receive first program information for a plurality of programs from a first external apparatus connected via a network. The second receiver is configured to receive a channel identifier of a first program from a second external apparatus. The extraction module is configured to extract, from the first program information, second program information for a single program associated with a channel indicated by the channel identifier, and a time point. The display module is configured to display information that is based on the second program information.

8 Claims, 7 Drawing Sheets

INFORMATION PROCESSING APPARATUS, BROADCAST RECEIVING APPARATUS AND INFORMATION PROCESSING METHOD

CROSS REFERENCE TO RELATED APPLICATION(S)

This application is based upon and claims the benefit of priority from Japanese Patent Application No. 2011-042473 filed on Feb. 28, 2011, the entire contents of which are incorporated herein by reference.

FIELD

Embodiments described herein relate generally to an information processing apparatus, a broadcast receiving apparatus and an information processing method for processing program-related information.

BACKGROUND

There is a technique for receiving broadcast waves of television broadcasting and for extracting program information included in the broadcast waves. In this technique, the extracted program information is used to display a screen such as an electronic program guide screen or a screen in which an image of the program information is superimposed on a program video.

An information processing apparatus such as a mobile terminal displays program information for a broadcast program displayed on a television apparatus, thereby enabling improvement in user's convenience. In this case, it is conceivable that the television apparatus, for example, may extract the program information superimposed on broadcast waves and transmit the extracted program information to the mobile terminal.

However, a method for utilizing program information superimposed on broadcast waves might be limited due to guidelines and the like. For example, it might be undesirable for an apparatus, which has received broadcast waves, to output program information included in the broadcast waves to another apparatus. Therefore, an information processing apparatus is preferably capable of receiving preferred program information different from program information superimposed on broadcast waves.

BRIEF DESCRIPTION OF THE SEVERAL VIEWS OF THE DRAWINGS

A general configuration that implements the various features of the invention will be described with reference to the drawings. The drawings and the associated descriptions are provided to illustrate embodiments of the invention and not to limit the scope of the invention.

DETAILED DESCRIPTION

In general, according to one embodiment, an information processing apparatus includes a first receiver, a second receiver, an extractor and a display module. The first receiver is configured to receive first program information for a plurality of programs from a first external apparatus connected via a network. The second receiver is configured to receive a channel identifier of a first program from a second external apparatus. The extraction module is configured to extract, from the first program information, second program information for a single program associated with a channel indicated by the channel identifier, and a time point. The display module is configured to display information that is based on the second program information.

Hereinafter, exemplary embodiments will be described with reference to the drawings.

First Embodiment

Figure 1:
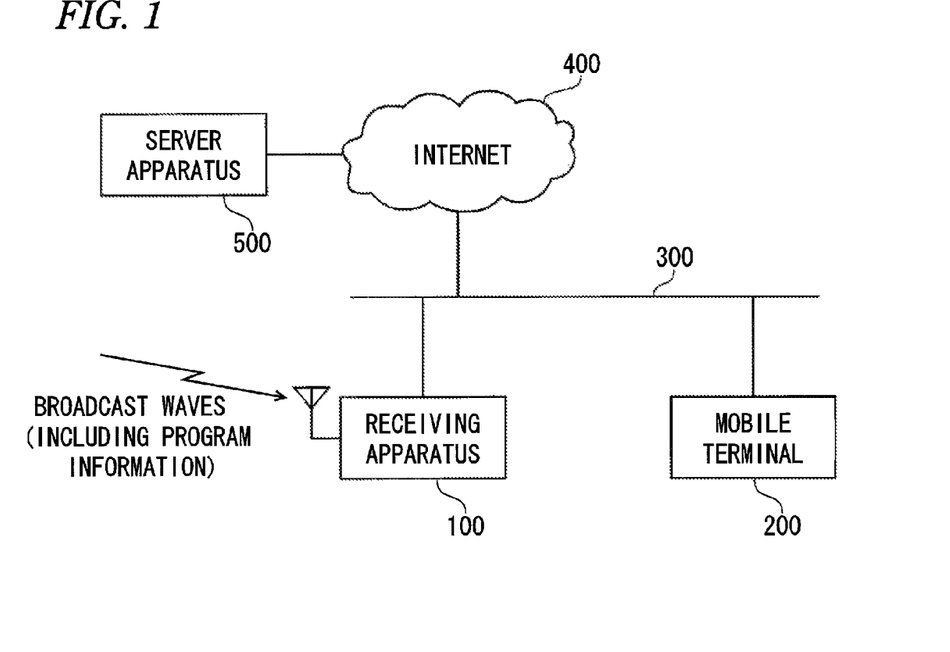
FIG. 1 is an exemplary diagram illustrating usage of a receiving apparatus, a mobile terminal and a server apparatus according to a first embodiment.

FIG. 1 is a diagram illustrating exemplary usage of an information processing system according to a first embodiment. The information processing system according to the present embodiment includes a receiving apparatus 100, a mobile terminal 200 and a home network 300, and is connected to a server apparatus 500 via the Internet 400. Further, a broadcast receiving apparatus according to the present embodiment is implemented as the receiving apparatus 100, for example. Furthermore, the receiving apparatus 100 and the mobile terminal 200 are connected to each other via the wired/wireless home network 300.

In this embodiment, the receiving apparatus 100 has the function of receiving broadcast waves on which a video of television broadcasting and program information for each broadcast program of the television broadcasting are superimposed. Moreover, the receiving apparatus 100 is capable of receiving, from the server apparatus 500 connected via the Internet 400, program information for each broadcast program of television broadcasting, which is stored in the server apparatus 500. Besides, the receiving apparatus 100 is capable of comparing program information included in broadcast waves with program information received from the server apparatus 500, and transmitting preferred program information to the mobile terminal 200. Details of the foregoing processing will be described below with reference to FIGS. 2 to 7.

Figure 2:
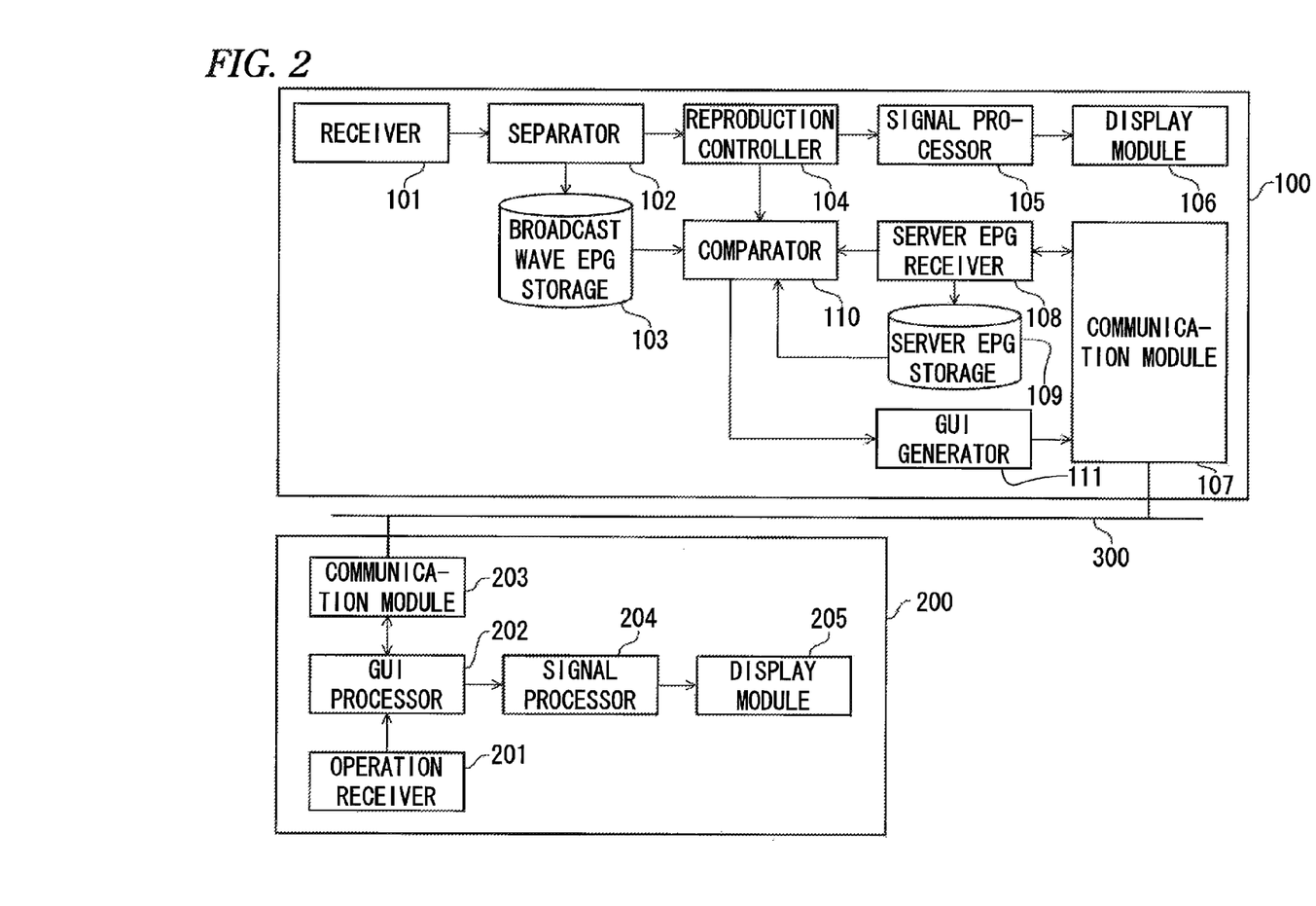
FIG. 2 is an exemplary diagram illustrating functional blocks of the receiving apparatus and the mobile terminal according to the first embodiment.

FIG. 2 is a diagram illustrating examples of functional blocks of the receiving apparatus 100 and the mobile terminal 200.

The receiving apparatus 100 includes: a receiver 101; a separator 102; a broadcast wave EPG storage 103; a reproduction controller 104; a signal processor 105; a display module 106; a communication module 107; a server EPG receiver 108; a server EPG storage 109; a comparator 110; and a GUI generator 111.

The receiver 101 is a tuner module or the like for receiving broadcast waves of BS digital broadcasting, terrestrial digital broadcasting, etc. The separator 102 separates various pieces of data included in the broadcast waves received by the receiver 101. For example, video data of a television program, program information (EPG: Electronic Program Guide) and the like are superimposed on broadcast waves. Note that in this embodiment, the broadcast waves received by the receiver 101 include program information for each of a plurality of broadcast programs. The separator 102 extracts/separates program information and video data from the broadcast waves, outputs the program information to the broadcast wave EPG storage 103, and outputs the video data to the reproduction controller 104. Then, the broadcast wave EPG storage 103 stores the program information for each of the plurality of programs, which has been extracted from the broadcast waves.

The reproduction controller 104 controls reproduction of a video superimposed on the broadcast waves being received by the receiver 101. Specifically, in accordance with an operation input or the like from a user, the reproduction controller 104 decides which channel should be selected for display of a video on the display module 106. Then, the reproduction controller 104 instructs the receiver 101 to receive broadcast waves of the decided channel, outputs, to the signal processor 105, video data inputted from the separator 102, and allows the signal processor 105 to decode (reproduce) the video data. Note that the operation input from the user is inputted to the receiving apparatus 100 in the form of, for example, a channel change command received by the communication module 107 from the mobile terminal 200 or a channel change command received by an unillustrated light receiver from a remote control.

The signal processor 105 decodes (reproduces) the video data inputted from the reproduction controller 104. Subsequently, the signal processor 105 converts the decoded video data into a video signal of a format displayable on the display module 106, and outputs the video signal to the display module 106. Then, the display module 106 displays a video using the inputted video signal.

The communication module 107 transmits and receives various pieces of data to and from the mobile terminal 200 connected via the network 300. In this embodiment, the communication module 107 receives, for example, a program information request command, a channel change command and the like from the mobile terminal 200. Furthermore, the communication module 107 transmits data or the like of program information. Moreover, the communication module 107 also transmits a program information request command to the server apparatus 500 connected via the Internet 400, and receives program information transmitted from the server apparatus 500 in response to the request command.

The server EPG receiver 108 receives program information for each of a plurality of programs from the server apparatus 500 via the communication module 107. In this embodiment, for each program, the program information is associated with a program name, a channel identifier, program start and end times, a program content explanatory text, etc. Further, the server EPG receiver 108 may receive, from the server apparatus 500, additional information for the program information, which is added for each program. In this embodiment, examples of the additional information include: a keyword such as a phrase included in the program content explanatory text of the program information; and an address information of a program-related Internet homepage (web page). Note that the server apparatus 500 may extract the keyword from the program content explanatory text of the program information stored in the server apparatus 500, or the server EPG receiver 108 may extract the keyword from the program content explanatory text of the received program information. Furthermore, the server EPG receiver 108 allows the received program information and additional information to be stored in the server EPG storage 109.

Note that when the communication module 107 has received the program information request command from the mobile terminal 200, for example, the server EPG receiver 108 receives the program information and additional information from the server apparatus 500. Moreover, upon reception of the program information request command, the server EPG receiver 108 notifies the comparator 110 of the program information request command. Alternatively, in this case, the server EPG receiver 108 may receive the program information when a certain period of time or more has elapsed since the previous program information reception. Optionally, the server EPG receiver 108 may receive the program information at certain time intervals, for example.

The comparator 110 compares the program information stored in the server EPG storage 109 with the program information stored in the broadcast wave EPG storage 103. In this embodiment, upon reception of the notification from the server EPG receiver 108, the comparator 110 receives, from the reproduction controller 104, time point information for the current time point, and an identifier of the channel on which video data is being reproduced by the reproduction controller 104. Subsequently, the comparator 110 extracts, from the program information stored in the server EPG storage 109, a plurality of pieces of program information for the channel indicated by the received channel identifier, and further extracts, from the plurality of pieces of program information, program information of a single program associated with the time point indicated by the time point information.

Furthermore, the comparator 110 extracts, from the program information of a plurality of programs stored in the broadcast wave EPG storage 103, program information of a single program associated with the time point information and channel identifier received from the reproduction controller 104.

Then, the comparator 110 compares the program information extracted from the broadcast wave EPG storage 103 with the program information extracted from the server EPG storage 109, thereby determining whether or not these pieces of program information correspond to each other. In this embodiment, the comparator 110 compares these pieces of program information with each other to determine whether or not the program name of the program information extracted from the broadcast wave EPG storage 103 is identical to that of the program information extracted from the server EPG storage 109, for example. Then, when the program information extracted from the broadcast wave EPG storage 103 and the program information extracted from the server EPG storage 109 correspond to each other, the comparator 110 outputs, to the GUI generator 111, the program information extracted from the server EPG storage 109. Note that when the program information is outputted to the GUI generator 111, the additional information for this program information is also outputted to the GUI generator 111.

Upon input of the program information and additional information from the comparator 110, the GUI generator 111 generates GUI data by using these pieces of information. In this embodiment, the GUI data includes: images indicative of the program information such as the program name and program content explanatory text; an image indicative of the additional information such as a keyword, homepage information or the like; position information indicative of positions of these images on a screen; and command information for execution of certain processing upon reception of an operation input for the image indicative of the additional information. Further, the GUI generator 111 transmits the generated GUI data to the mobile terminal 200 via the communication module 107.

In this embodiment, the GUI generator 111 may generate GUI data responsive to a resolution of a display module 205 of the mobile terminal 200, for example. For instance, the mobile terminal 200 transmits a program information request command in such a manner that screen resolution information of the mobile terminal 200 is included in the program information request command, and the GUI generator 111 not only generates an image of a resolution responsive to the screen resolution information included in the received program information request command but also adjusts, in accordance with this resolution, position information indicative of the position of the image. Further, the GUI generator 111 sets a font size of character information, such as program title and program content, for example, to a size responsive to the screen resolution information. In other words, the GUI generator 111 generates GUI data (screen data) of a resolution responsive to a screen resolution of the mobile terminal 200. Alternatively, the screen resolution of the mobile terminal 200 and a device identifier of the mobile terminal 200 may be registered in advance in the receiving apparatus 100 so as to be associated with each other, and the mobile terminal 200 may transmit a program information request command including the device identifier. In that case, the GUI generator 111 is capable of generating GUI data in accordance with the screen resolution associated with the device identifier included in the command.

Next, the examples of the functional blocks of the mobile terminal 200 will be described. The mobile terminal 200 includes: an operation receiver 201; a GUI processor 202; a communication module 203; a signal processor 204; and the display module 205. The operation receiver 201 receives a user operation input provided from outside the mobile terminal 200. Further, the operation receiver 201 receives a user operation input performed on a display screen described later with reference to FIGS. 3A and 3B, for example, and outputs the received operation input to the GUI processor 202.

The GUI processor 202 generates a GUI and processes an operation input performed on a screen of the GUI displayed on the display module 205. The GUI processor 202 generates GUI image data of a receiving apparatus operation screen P10 described later with reference to FIG. 3A. In this embodiment, upon reception of a program information request operation input performed on the receiving apparatus operation screen P10, the GUI processor 202 transmits a program information request command to the receiving apparatus 100 via the communication module 203. Then, when the communication module 203 has received GUI data transmitted from the receiving apparatus 100, the GUI processor 202 generates image data of a program information screen P20 based on the GUI data, and outputs the generated image data to the signal processor 204. Note that the program information screen P20 will be described later with reference to FIG. 3B.

Upon input of the image data from the GUI processor 202, the signal processor 204 converts the data into a video signal of a format displayable on the display module 205, and outputs the video signal to the display module 205. Then, the display module 205 displays a video responsive to the inputted video signal.

Next, structure examples of the screens displayed on the mobile terminal 200 will be described with reference to FIGS. 3A and 3B.

Figure 3A:
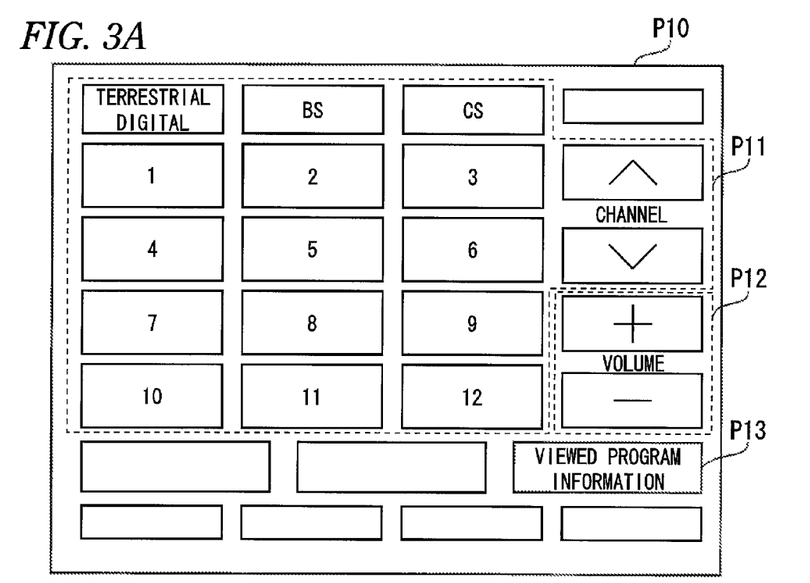
FIG. 3A is an exemplary diagram illustrating an example of a screen displayed on the mobile terminal according to the first embodiment.

FIG. 3A illustrates an example of the receiving apparatus operation screen P10 generated and displayed on the mobile terminal 200. In this example, images provided on the receiving apparatus operation screen P10 include: an image P11 for receiving a channel change operation for a video displayed on the receiving apparatus 100; an image P12 for receiving a volume change operation for a sound outputted from the receiving apparatus 100; and an image P13 for receiving a program information request operation for allowing program information of a program displayed on the receiving apparatus 100 to be displayed on the display module 205 of the mobile terminal 200. Furthermore, when an operation input by which the image P13 is designated is received by the operation receiver 201, the communication module 203 transmits a program information request command to the receiving apparatus 100. Note that in this embodiment, the communication module 203 may transmit a program information request command including information on the screen resolution of the display module 205 and/or the device identifier of the mobile terminal 200.

Figure 3B:
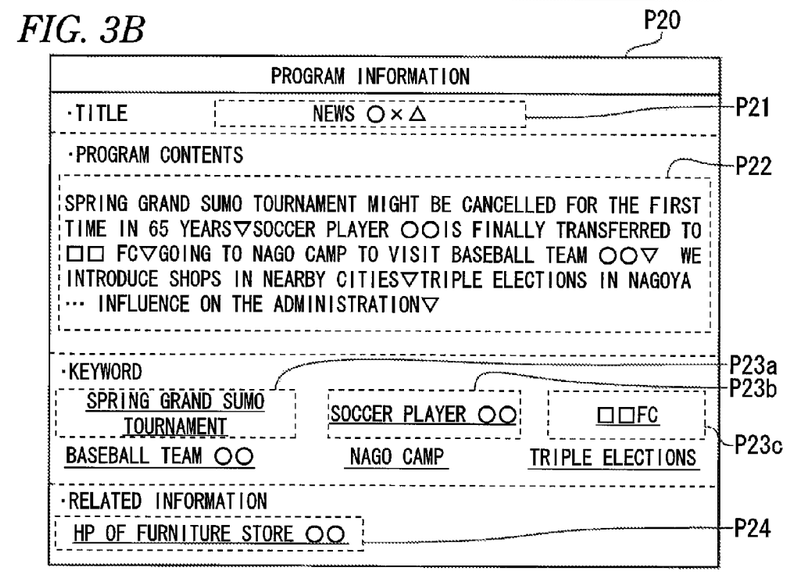
FIG. 3B is an exemplary diagram illustrating an example of a screen displayed on the mobile terminal according to the first embodiment.

FIG. 3B is a diagram illustrating an example of the program information screen P20 generated and displayed on the mobile terminal 200 based on GUI data transmitted from the receiving apparatus 100.

Images provided on the screen P20 include: a title image P21; a content explanatory image P22; keyword images P23a to P23c; and related information image P24. Note that information displayed on the screen P20 is based on information extracted from program information received from the server apparatus 500 as mentioned above. In this example, the title image P21 is an image indicative of a program name. The content explanatory image P22 is an image indicative of a program content explanatory text. The keyword images P23a to P23c are images concerning keywords extracted from the program content explanatory text of the program information. These keywords are extracted by the server apparatus 500, for example.

In this embodiment, the GUI processor 202 is set so that certain processing is executed based on command information, generated by the GUI generator 111 of the receiving apparatus 100, when operation input(s) performed on the keyword images P23a to P23c is/are received. For example, for each of the keyword images P23a to P23c, the GUI generator 111 of the receiving apparatus 100 generates GUI data with which a search process performed using the keyword indicated by the keyword image is associated. Furthermore, the GUI processor 202 of the mobile terminal 200 is set so that when the mobile terminal 200 has received an operation input performed on the image, an Internet search is conducted using the keyword associated with this operation image. In other words, when the operation receiver 201 has received operation input(s) performed on the keyword images P23a to P23c, the communication module 203 conducts an Internet search using the keyword of the keyword image for which the operation input has been received, and the display module 205 displays a screen on which a search result is presented.

The related information image P24 is an image for presenting a program-related web page or the like. When an operation input performed on this image is received by the operation receiver 201, the communication module 203 receives information of a web page having a URL set in the related information image P24, and the display module 205 displays the information of the web page.

Note that the receiving apparatus 100 does not necessarily have to transmit program information as GUI data. Specifically, the receiving apparatus 100 may transmit, to the mobile terminal 200, information such as a program name, a program content description, a keyword and an address of a related web page in a text format or the like, for example, and the GUI processor 202 of the mobile terminal 200 may generate the foregoing screen based on these pieces of information. In other words, the receiving apparatus 100 only has to transmit at least program-related information to the mobile terminal 200. Furthermore, this information only has to be based on the program information received from the server apparatus 500.

Next, exemplary program information comparison processing performed by the receiving apparatus 100 will be described with reference to FIGS. 4A and 4B.

Figure 4A:
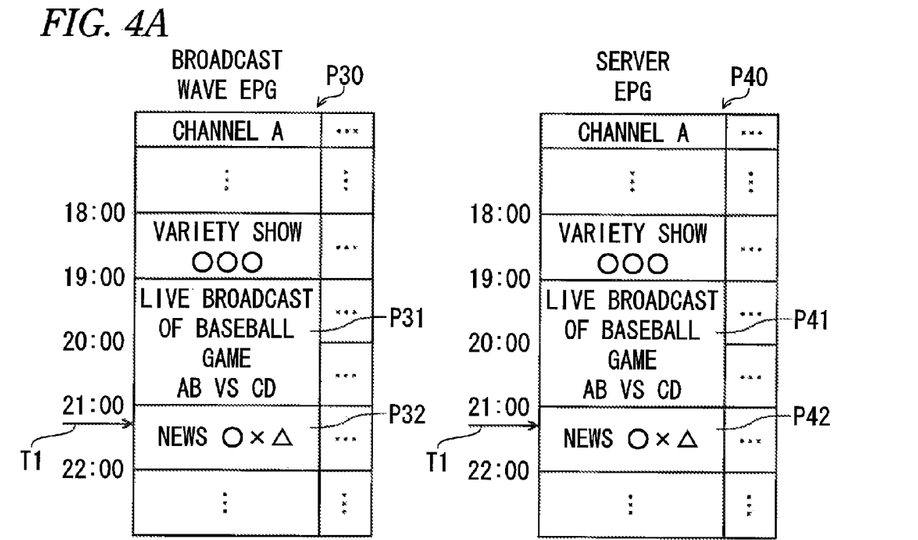
FIG. 4A is an exemplary diagram illustrating processing for comparing program information by the receiving apparatus according to the first embodiment.

FIG. 4A is a diagram illustrating exemplary processing for comparing program information extracted from broadcast waves by the receiving apparatus 100 with program information received from the server apparatus 500. The broadcast wave EPG storage 103 stores a broadcast wave EPG P30 that is based on the program information extracted from broadcast waves. In this embodiment, in the broadcast wave EPG P30, the program information such as a broadcast channel, a program name, a program content explanatory text and broadcast start and end time points is associated with each of a plurality of programs. On the other hand, the server EPG storage 109 stores a server EPG P40 that is based on the program information received from the server apparatus 500. In the server EPG P40, the program information such as a broadcast channel, a program name, a program content explanatory text, broadcast start and end time points and additional information is associated with each of a plurality of programs. In other words, in the broadcast wave EPG P30 and the server EPG P40, broadcast programs are associated with respective time periods of each of a plurality of broadcast channels, and a program name and a program content explanatory text are associated with each broadcast program.

In this embodiment, when the comparator 110 performs a comparison in response to a program information request command provided from the mobile terminal 200, the comparator 110 receives, from the reproduction controller 104, a channel identifier of a currently reproduced video and current time point information. Then, when the received channel identifier indicates a channel A and the current time point information indicates a time point T1, the comparator 110 extracts program information of a program, associated with the channel identifier and time point information, from the program information (broadcast wave EPG) P30 stored in the broadcast wave EPG storage 103 and the program information (server EPG) P40 stored in the server EPG storage 109. In other words, the comparator 110 extracts program information of programs P32 and P42 in this case.

Then, the comparator 110 determines whether or not the program information of the program P32 extracted from the program information stored in the broadcast wave EPG storage 103 corresponds to that of the program P42 extracted from the program information stored in the server EPG storage 109. That is, the comparator 110 determines whether or not the program name included in the program information of the program P32 is identical to the program name included in the program information of the program P42, for example. Then, in the example illustrated in FIG. 4A, since the program names are identical, the comparator 110 outputs, to the GUI generator 111, the program information of the program P42 included in the server EPG P40.

However, in a program such as a live broadcast of a sports game, for example, the airtime might be changed due to extra time and the like of the game. Further, the time required to reflect an airtime change in program information might be different between program information superimposed on broadcast waves and program information distributed by a program information distribution server. Specifically, since program information superimposed on broadcast waves is distributed by each broadcaster, the time required to reflect an airtime change in program information superimposed on broadcast waves may be shorter than the time required to reflect an airtime change in program information distributed by the server apparatus 500.

Figure 4B:
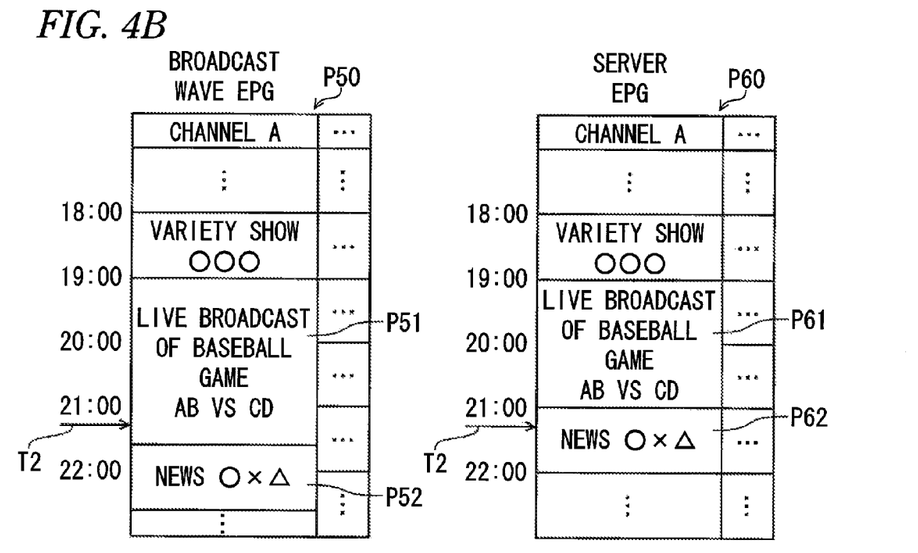
FIG. 4B is an exemplary diagram illustrating the program comparison processing performed when airtime of a broadcast program is extended according to the first embodiment.

FIG. 4B illustrates exemplary comparison processing performed when airtime of a broadcast program is extended. Note that in this example, an airtime change is reflected in a broadcast wave EPG P50, but the airtime change is not reflected in a server EPG P60.

In this example, when the communication module 107 has received a program information request command from the mobile terminal 200 at a time point T2, the comparator 110 receives a channel identifier of a currently reproduced video and current time point information from the reproduction controller 104. Then, when the received channel identifier indicates the channel A and the current time point information indicates the time point T2, the comparator 110 extracts, from program information stored in the broadcast wave EPG storage 103 and the server EPG storage 109, program information of programs P51 and P62 associated with the channel identifier and time point information.

Subsequently, the comparator 110 determines whether or not the program name of the program P51 corresponds to that of the program P62. In the example illustrated in FIG. 4B, since these program names are not identical, the comparator 110 extracts, from the server EPG storage 109, program information of a program P61 immediately preceding the program P62. Then, the comparator 110 compares the program name of the program P51 with that of the program P61. In the example of FIG. 4B, since the program names of the programs P51 and P61 are identical, the comparator 110 outputs, to the GUI generator 111, the program information of the program P61 included in the server EPG P60.

Next, an example of a processing flow concerning display of program information by the receiving apparatus 100 and the mobile terminal 200 will be described with reference to FIG. 5.

First, the receiving apparatus 100 receives broadcast waves of one of channels (S501), thereby receiving program information superimposed on the broadcast waves. Further, the receiving apparatus 100 displays, on the display module 106, a video that is based on video data superimposed on the broadcast waves being received (S502). Then, the receiving apparatus 100 waits for reception of a program information request command from the mobile terminal 200 (S503).

When the video is displayed on the receiving apparatus 100, the mobile terminal 200 displays a receiving apparatus operation screen such as one illustrated in FIG. 3A, for example (S504), and receives an operation input performed on the screen by a user (S505). Then, upon reception of a program information request operation performed by the user (Yes in S505), the mobile terminal 200 transmits the program information request command to the receiving apparatus 100 (S506). Subsequently, the mobile terminal 200 waits for reception of GUI data transmitted from the receiving apparatus 100 (S507).

In this example, when the receiving apparatus 100 has received the program information request command transmitted from the mobile terminal 200 (Yes in S503), the comparator 110 receives current time point information and a channel identifier of a currently displayed program from the reproduction controller 104 (S508 and S509). Then, the comparator 110 extracts, from the broadcast wave EPG storage 103, program information of a program associated with the current time point information and the channel identifier (S510).

Furthermore, upon reception of the program information request command in S503, the server EPG receiver 108 determines whether or not program information received from the server apparatus 500 is stored in the server EPG storage 109 (S511). When the program information is stored in the server EPG storage 109 (Yes in S511), the comparator 110 extracts, from the program information stored in the server EPG storage 109, program information of a program associated with the time point information and channel identifier which are received in S508 and S509, respectively (S514).

On the other hand, when the program information is not stored in the server EPG storage 109 (No in S511), the server EPG receiver 108 transmits the program information request command to the server apparatus 500 (S512), and receives program information transmitted in response to the request command (S513). Then, the comparator 110 extracts, from the program information received in S513, program information of a program associated with the time point information and channel identifier which are received in S508 and S509, respectively (S514).

Note that the received program information and a reception time of the program information may be stored in the server EPG storage 109 so as to be associated with each other. Moreover, when the reception time of the program information stored in the server EPG storage 109 is within a certain period of time in S511, the receiving apparatus 100 may execute the process of S514, and when the reception time is before a certain period of time in S511, the receiving apparatus 100 may execute the processes of S512 and S513.

Subsequently, the comparator 110 compares the program information extracted from the broadcast wave EPG storage 103 with the program information extracted from the server EPG storage 109, thereby determining whether or not these pieces of program information correspond to each other (S515). Specifically, the comparator 110 determines whether or not program names of these two pieces of program information are identical, for example. In this example, when the program names are not identical (No in S516), the comparator 110 extracts, from the program information stored in the server EPG storage 109, program information of an immediately preceding program on the same channel as the program information extracted in S514 (S517), and executes the processes of S515 and S516 again.

Then, when the program names are identical (Yes in S516), the comparator 110 outputs, to the GUI generator 111, the program information extracted from the server EPG storage 109. Subsequently, the GUI generator 111 generates, based on the program information, GUI data of a program information screen such as one illustrated in FIG. 3B (S518), and the communication module 107 transmits the generated GUI data to the mobile terminal 200 (S519).

Then, upon reception of the GUI data by the mobile terminal 200 (Yes in S507), the mobile terminal 200 displays, in accordance with the GUI data, the program information screen such as one illustrated in FIG. 3B (S520).

Note that in S510 and S514, the comparator 110 does not necessarily have to extract program information associated with the current time point information received from the reproduction controller 104. For example, the mobile terminal 200 may transmit a program information request command including time point information on, for example, a time point at which a program information request operation has been received from the user, and the comparator 110 may extract program information associated with the time point information included in the command. In other words, the comparator 110 may extract program information associated with a time point responsive to the program information request command, such as a time point at which the program information request command has been received or a time point included in the command.

Figure 5:
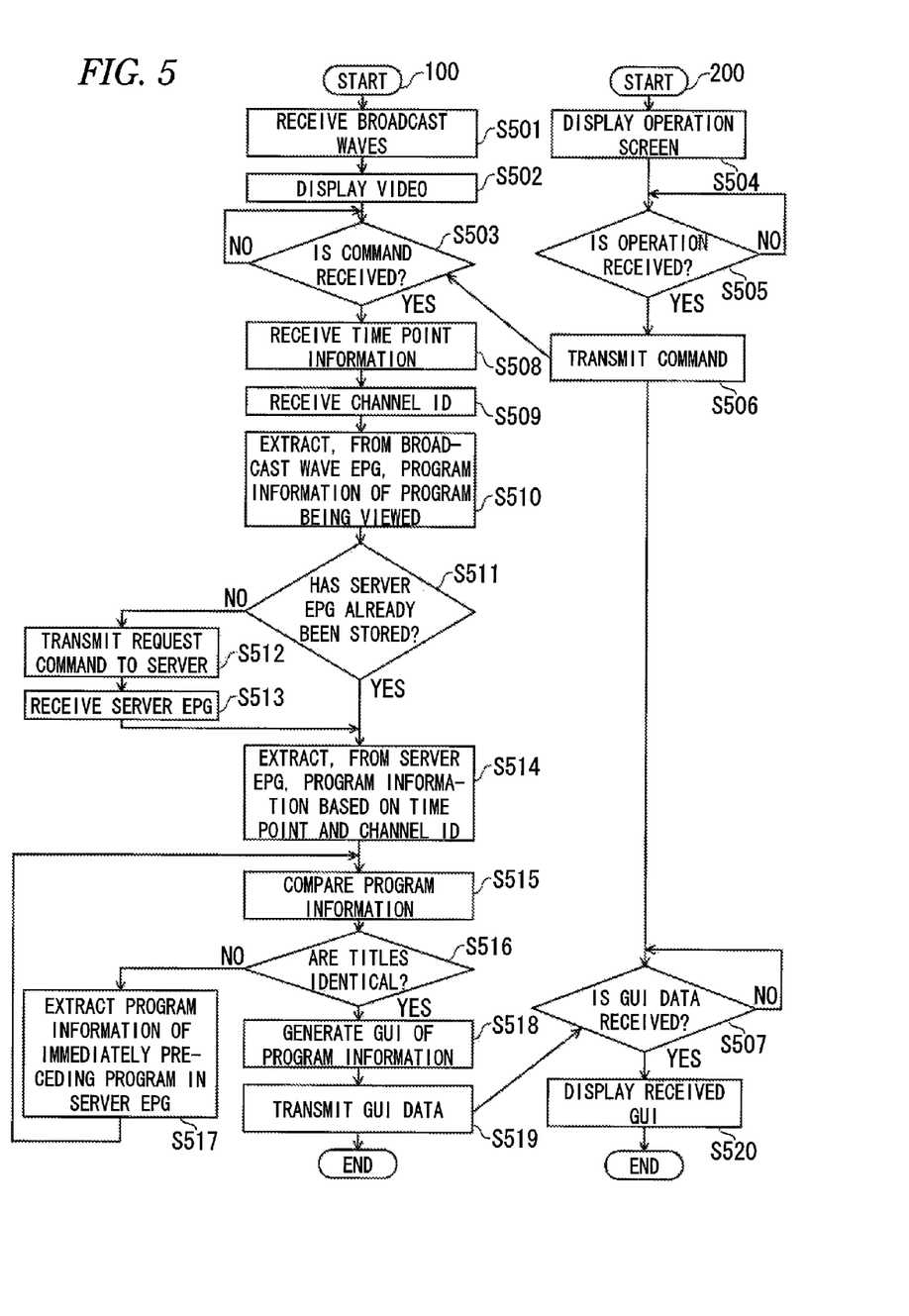
FIG. 5 is an exemplary flowchart illustrating processing concerning display of program information by the receiving apparatus and the mobile terminal according to the first embodiment.

Further, referring to the flowchart of FIG. 5, the description is made on the assumption that the receiving apparatus 100 transmits GUI data for program information to the mobile terminal 200, but the receiving apparatus 100 does not necessarily have to transmit program information in a GUI data format. Furthermore, the receiving apparatus 100 may only have to transmit at least information such as program name and program content to the mobile terminal 200 based on the program information extracted from the server EPG storage 109. Moreover, in that case, the mobile terminal 200 generates and displays a screen based on data for the program information received from the receiving apparatus 100.

Besides, the receiving apparatus 100 does not necessarily have to compare the program information extracted from the broadcast wave EPG storage 103 with the program information extracted from the server EPG storage 109. Alternatively, the receiving apparatus 100 may only have to extract, from the server EPG storage 109, at least program information of a program associated with current time point information and an identifier of a channel being viewed, and transmit the extracted program information to the mobile terminal 200.

Second Embodiment

Next, a second embodiment will be described with reference to FIGS. 6 and 7.

Figure 6:
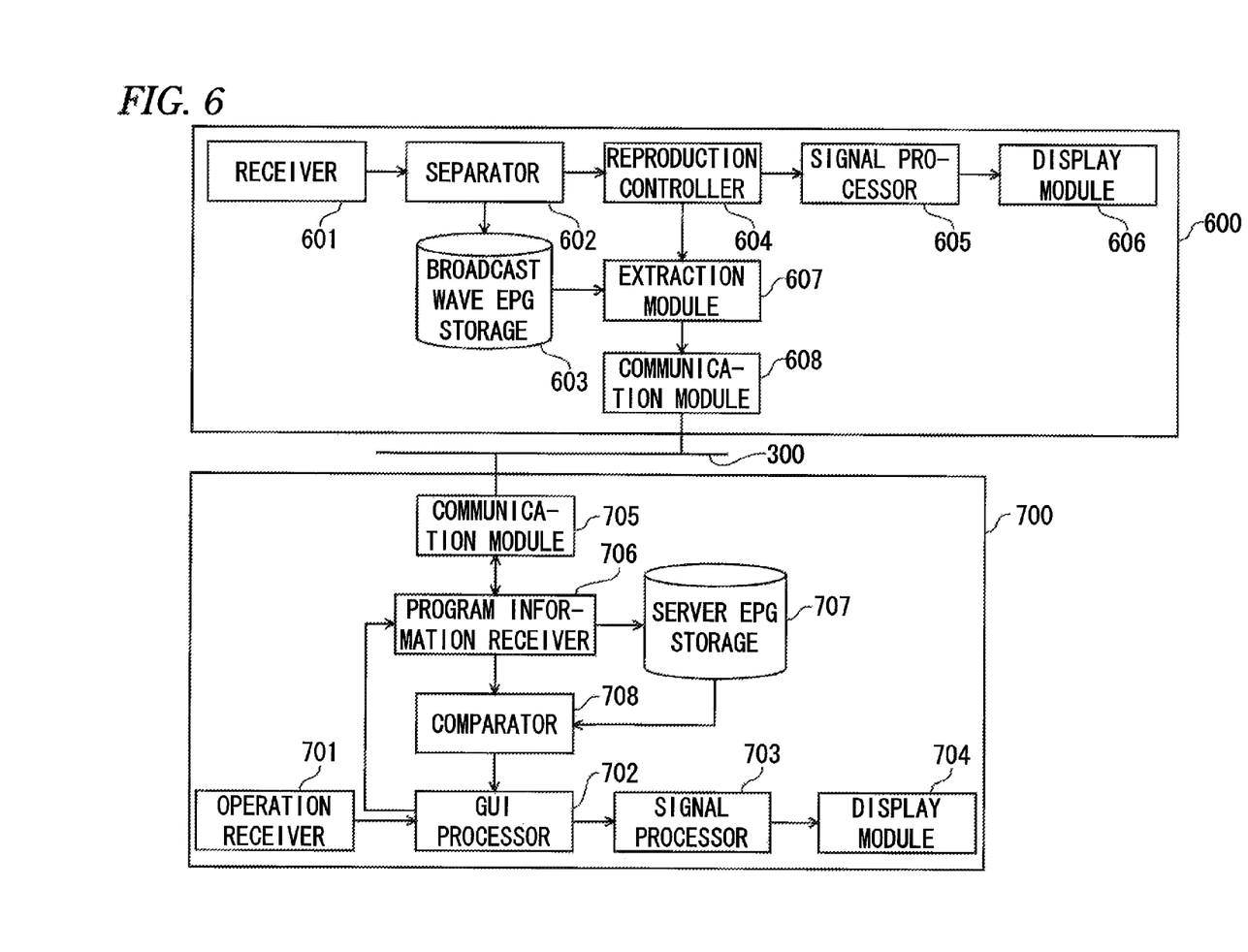
FIG. 6 is an exemplary diagram illustrating functional blocks of the receiving apparatus and the mobile terminal according to a second embodiment.

FIG. 6 is a diagram illustrating examples of functional blocks of a receiving apparatus 600 and a mobile terminal 700 according to the second embodiment. Note that the receiving apparatus 600 and the mobile terminal 700 according to the second embodiment have functions corresponding to those of the receiving apparatus 100 and the mobile terminal 200 according to the first embodiment, and therefore, functions different from those of the receiving apparatus 100 and the mobile terminal 200 according to the first embodiment will be mainly described below. Further, similarly to the receiving apparatus 100 and the mobile terminal 200 according to the first embodiment, the receiving apparatus 600 and the mobile terminal 700 are connected to each other via a network 300. Furthermore, the mobile terminal 700 is connected to a server apparatus 500 via the network 300 and Internet 400.

First, the examples of the functional blocks of the receiving apparatus 600 will be described. The receiving apparatus 600 includes: a receiver 601; a separator 602; a broadcast wave EPG storage 603; a reproduction controller 604; a signal processor 605; a display module 606; an extraction module 607; and a communication module 608.

In this embodiment, the receiver 601, the separator 602, the broadcast wave EPG storage 603, the reproduction controller 604, the signal processor 605 and the display module 606 have functions corresponding to those of the receiver 101, the separator 102, the broadcast wave EPG storage 103, the reproduction controller 104, the signal processor 105 and the display module 106 according to the first embodiment.

Specifically, the receiver 601 receives broadcast waves on which video data and program information of a television program are superimposed, and the separator 602 separates the video data and the program information from the broadcast waves. Then, the separator 602 outputs the program information to the broadcast wave EPG storage 603, and outputs the video data to the reproduction controller 604. The broadcast wave EPG storage 603 stores the inputted program information.

In accordance with a user operation input or the like provided from outside the receiving apparatus 600, the reproduction controller 604 decides which channel should be selected for display of a video on the display module 606. Then, the reproduction controller 604 instructs the receiver 601 to receive broadcast waves of the decided channel, and outputs, to the signal processor 605, the video data inputted from the separator 602.

The signal processor 605 decodes the video data inputted from the reproduction controller 604; then, the signal processor 605 converts the decoded video data into a video signal of a format displayable on the display module 606, and outputs the video signal to the display module 606. Subsequently, the display module 606 displays a video using the inputted video signal.

When a first program information request command provided from the mobile terminal 700 is received by the communication module 608, the extraction module 607 receives, from the reproduction controller 604, current time point information of the current time point and a channel identifier of a currently reproduced (displayed) program. Then, from program names included in program information of a plurality of programs stored in the broadcast wave EPG storage 603, the extraction module 607 extracts the program name of a program associated with the current time point information and the channel identifier. Subsequently, the communication module 608 transmits the current time point information, the channel identifier and the program name to the mobile terminal 700.

Note that the extraction module 607 may extract a program name stored in the broadcast wave EPG storage 603, and may generate a program name identifier in accordance with the program name. In that case, the extraction module 607 converts, for example, a character string of the extracted program name into a different character string or the like based on a conversion rule set in advance, and determines this different character string as the program name identifier. Further, the communication module 608 transmits this program name identifier to the mobile terminal 700. In other words, the communication module 608 may transmit the program name as the program name identifier in some type of format concerning the program name. Note that a conversion rule corresponding to the conversion rule set for the extraction module 607 of the receiving apparatus 600 is set for a comparator 708 of the mobile terminal 700 in that case. Moreover, the comparator 708 converts the program name identifier in accordance with the conversion rule, thus obtaining a program name indicated by the identifier.

Next, the examples of the functional blocks of the mobile terminal 700 will be described. The mobile terminal 700 includes: an operation receiver 701; a GUI processor 702; a signal processor 703; a display module 704; a communication module 705; a program information receiver 706; a server EPG storage 707; and the comparator 708.

The operation receiver 701 receives a user operation input provided from outside the mobile terminal 700. Further, the operation receiver 701 receives a user operation input performed on a display screen displayed on the display module 704, and outputs the received operation input to the GUI processor 702.

The GUI processor 702 generates a GUI and processes an operation input performed on a GUI screen displayed on the display module 704. The GUI processor 702 generates GUI image data of a receiving apparatus operation screen such as one illustrated in FIG. 3A. In this embodiment, when the operation receiver 701 has received a program information request operation input performed on the receiving apparatus operation screen, the GUI processor 702 instructs the program information receiver 706 to receive program information.

Then, upon input of program information from the comparator 708, the GUI processor 702 generates image data of a program information screen such as one illustrated in FIG. 3B based on the program information, and outputs the generated image data to the signal processor 703. Furthermore, upon reception of a channel change operation performed on the receiving apparatus operation screen, the GUI processor 702 instructs the communication module 705 to transmit a channel change command.

Upon input of the image data from the GUI processor 702, the signal processor 703 converts the data into a video signal of a format displayable on the display module 704, and outputs the video signal to the display module 704. Then, the display module 704 displays a video responsive to the inputted video signal.

The communication module 705 transmits and receives various pieces of data to and from the receiving apparatus 600 connected via the network 300. In this embodiment, the communication module 705 transmits the first program information request command to the receiving apparatus 600 in response to an instruction provided from the program information receiver 706. Then, upon reception of the current time point information, channel identifier and program name information transmitted from the receiving apparatus 600 in response to the request command, the communication module 705 outputs these pieces of information to the program information receiver 706.

Further, the communication module 705 transmits a second program information request command to the server apparatus 500 in response to an instruction provided from the program information receiver 706, and receives program information transmitted in response to the request command. Then, the communication module 705 outputs the received program information to the program information receiver 706.

Furthermore, upon reception of a channel change instruction from the GUI processor 702, the communication module 705 transmits the channel change command to the receiving apparatus 600.

The program information receiver 706 receives the program information via the communication module 705. Upon reception of the program information reception instruction from the GUI processor 702, the program information receiver 706 instructs the communication module 705 to transmit the first program information request command to the receiving apparatus 600, and to transmit the second program information request command to the server apparatus 500.

Then, the program information receiver 706 stores, in the server EPG storage 707, the program information received by the communication module 705 from the server apparatus 500, and outputs, to the comparator 708, the current time point information received by the communication module 705 from the receiving apparatus 600, the channel identifier of a program being reproduced (displayed) by the receiving apparatus 600, and the program name of the program.

Upon input of the current time point information, channel identifier and program name information from the program information receiver 706, the comparator 708 extracts, from the program information of a plurality of programs stored in the server EPG storage 707, program information of a single program associated with the current time point information and channel identifier. Subsequently, the comparator 708 determines whether or not the program name of the extracted program information is identical to the program name inputted from the program information receiver 706. Then, when these program names are identical, the comparator 708 outputs, to the GUI processor 702, the program information extracted from the server EPG storage 707.

Note that as mentioned above, a conversion rule, corresponding to the conversion rule set for the extraction module 607 of the receiving apparatus 600, may be set for the comparator 708. Further, upon input of a program name identifier from the receiving apparatus 600 via the communication module 705 and the program information receiver 706, the comparator 708 converts the program name identifier in accordance with the conversion rule, thus obtaining a program name indicated by this identifier. Subsequently, the comparator 708 makes a comparison between the program name obtained as a result of the conversion and the program name included in the program information extracted from the server EPG storage 707. Then, when these program names are identical, the comparator 708 outputs, to the GUI processor 702, the program information extracted from the server EPG storage 707.

Next, an example of a processing flow concerning display of program information by the receiving apparatus 600 and the mobile terminal 700 according to the second embodiment will be described with reference to FIG. 7.

First, the receiving apparatus 600 receives broadcast waves of one of channels (S801), thereby receiving program information superimposed on the broadcast waves. Further, the receiving apparatus 600 displays, on the display module 606, a video that is based on video data superimposed on the broadcast waves being received (S802). Then, the receiving apparatus 600 waits for reception of a first program information request command from the mobile terminal 700 (S803).

When the video is displayed on the receiving apparatus 600, the mobile terminal 700 displays a receiving apparatus operation screen such as one illustrated in FIG. 3A, for example (S804), and receives an operation input performed on the screen by a user (S805). Then, upon reception of a program information request operation performed by the user (Yes in S805), the mobile terminal 700 transmits the first program information request command to the receiving apparatus 600 (S806). Further, when program information received from the server apparatus 500 is not stored in the server EPG storage 707 (No in S807), the program information receiver 706 of the mobile terminal 700 transmits a second program information request command to the server apparatus 500 (S808). Subsequently, upon reception of the program information transmitted from the server apparatus 500 in response to the request command (S809), the server EPG storage 707 stores this program information. Then, the mobile terminal 700 waits for reception of information transmitted from the receiving apparatus 600 (S810).

On the other hand, in the receiving apparatus 600, upon reception of the first program information request command by the communication module 608 (Yes in S803), the extraction module 607 receives current time point information and a channel identifier of a currently reproduced program from the reproduction controller 604 (S811 and S812). Subsequently, from program information of a plurality of programs stored in the broadcast wave EPG storage 603, the extraction module 607 extracts program information of a single program associated with the current time point information and the channel identifier (S813). Then, the receiving apparatus 600 transmits a program name included in the extracted program information, the current time point information and the channel identifier to the mobile terminal 700 (S814).

Subsequently, in the mobile terminal 700, when the communication module 705 has received the program name, current time point information and channel identifier transmitted from the receiving apparatus 600 (Yes in S810), the comparator 708 extracts, from program information of a plurality of programs stored in the server EPG storage 707, program information of a single program associated with the received current time point information and channel identifier (S815). Then, the comparator 708 determines whether or not a program name, included in the program information extracted from the server EPG storage 707, is identical to the program name received from the receiving apparatus 600 (S816). When the program names are not identical (No in S816), the comparator 708 extracts, from the program information stored in the server EPG storage 707, program information of an immediately preceding program on the same channel as the program information extracted in S805 (S817), and executes the process of S816 again.

Then, when the program names are identical (Yes in S816), the comparator 708 outputs, to the GUI processor 702, the program information extracted from the server EPG storage 707. Subsequently, the GUI processor 702 generates, based on the program information, GUI data of a program information screen such as one illustrated in FIG. 3B (S818), and the display module 704 displays, in accordance with the GUI data, the program information screen such as one illustrated in FIG. 3B (S819).

Figure 7:
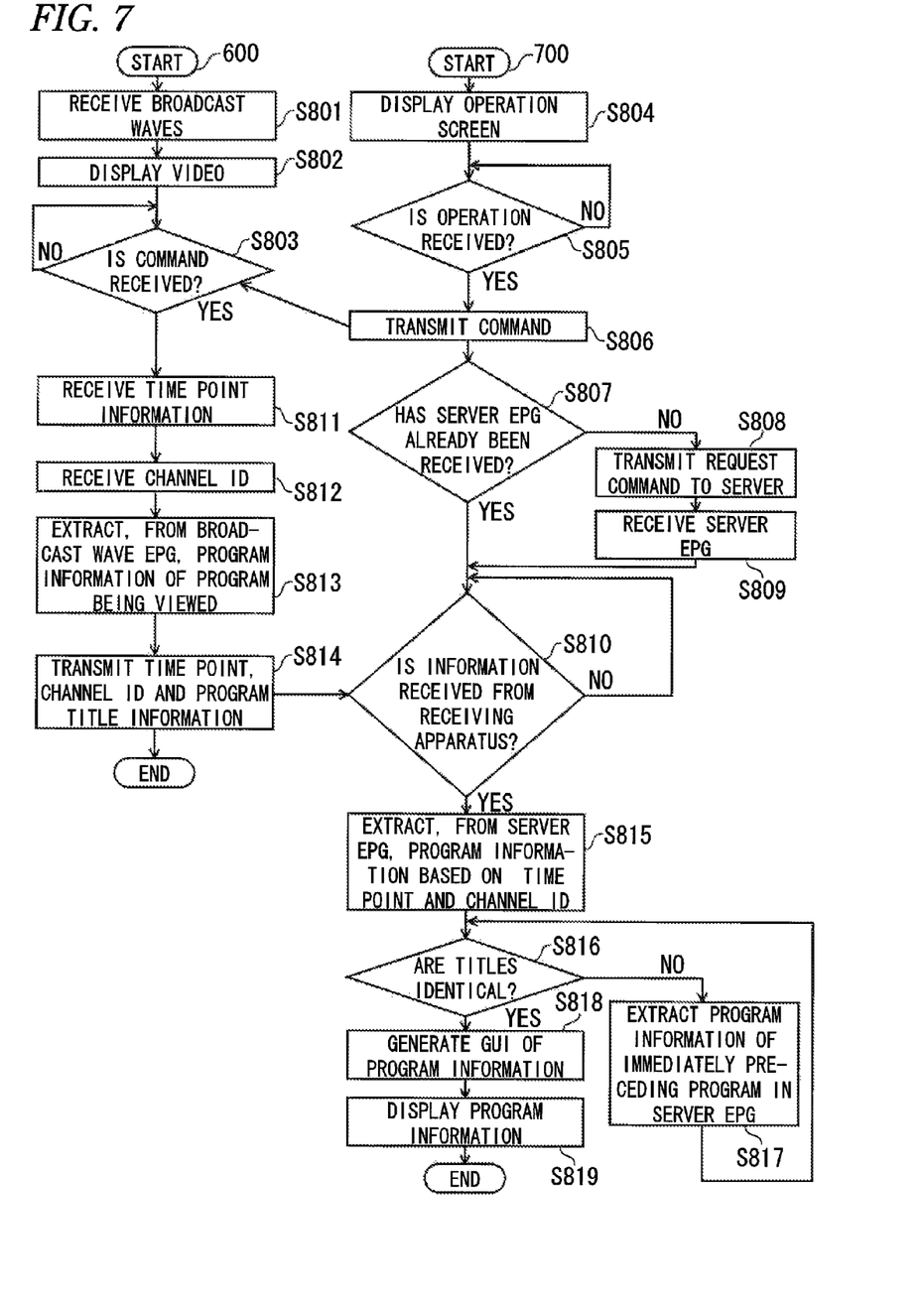
FIG. 7 is an exemplary flowchart illustrating processing concerning display of program information by the receiving apparatus and the mobile terminal according to the second embodiment.

Note that referring to the flowchart of FIG. 7, the description is made on the assumption that the mobile terminal 700 receives current time point information from the receiving apparatus 600, but the mobile terminal 700 does not necessarily have to receive current time point information from the receiving apparatus 600. For example, the mobile terminal 700 may include a counter module serving as a time counter, and the comparator 708 may receive current time point information from the counter module. In such a case, the mobile terminal 700 receives, from the counter module, time point information such as a time point at which a program information request operation performed on the mobile terminal 700 has been received or a time point at which program name and channel identifier have been received from the receiving apparatus 600. In this case, the reception of the program name and channel identifier from the receiving apparatus 600 is a process executed in response to the program information request operation performed on the mobile terminal 700. Furthermore, the time point indicated by the current time point information transmitted from the receiving apparatus 600 is the time point corresponding to a program information request transmitted in response to the program information request operation. In other words, in S815, the comparator 708 extracts program information of a single program associated with: the time point corresponding to the time point at which the program information request issued to the mobile terminal 700 has been received; and the channel identifier.

While certain embodiments have been described, these embodiments have been presented by way of example only, and are not intended to limit the scope of the invention. Indeed, the novel apparatus and method described herein may be embodied in a variety of other forms; furthermore, various omissions, substitutions and changes in the form of the apparatus and method, described herein may be made without departing from the sprit of the invention. The accompanying claims and their equivalents are intended to cover such forms or modifications as would fall within the scope and sprit of the invention.

What is claimed is:

1. An information processing apparatus comprising:
a user interface;
an operation receiver configured to receive, from the user interface, a user request for program information from a first external apparatus;
a transceiver configured
to receive first metadata of a plurality of programs from a second external apparatus via the Internet;
to transmit the user request to the first external apparatus via a wireless network; and
to receive, from the first external apparatus, a channel identifier of a program currently being displayed by the first external apparatus, and second metadata of the program currently being displayed by the first external apparatus, wherein the second metadata is received at the first external apparatus along with the program currently being displayed by the first external apparatus; and
an extractor configured to extract, from the first metadata, third metadata of a program associated with (i) a channel indicated by the channel identifier, and (ii) a current time point, and to extract, from the first metadata, fourth metadata of a program immediately preceding in time the program indicated by the third metadata,
wherein the information processing apparatus is configured to compare the second metadata with the third metadata in response to the user request, and,
if the third metadata corresponds to the second metadata, to output first program information that is based on the third metadata, and,
if the second metadata does not correspond to the third metadata, to output second program information that is based on the fourth metadata.

2. The apparatus of claim 1, wherein the current time point corresponds to a time at which the transceiver receives the second metadata from the first external apparatus.

3. The apparatus of claim 2, wherein if third metadata corresponds to the second metadata, the first program information includes a keyword for a program indicated by the third metadata, and
wherein if the second metadata does not correspond to the third metadata, the second program information includes a keyword for the program indicated by the fourth metadata.

4. The apparatus of claim 1,
wherein the transceiver is configured to acquire, from the second external apparatus, an address of a web page related to the program indicated by the third metadata and an address of a web page related to a program indicated by the fourth metadata,
wherein if the third metadata corresponds to the second metadata, the first program information includes a first image through which access is made to the address of the web page related to the program indicated by the third metadata, and
wherein if the second metadata does not correspond to the third metadata, the second program information includes a second image through which access is made to the address of the web page related to the program indicated by the fourth metadata.

5. An information processing method as implemented by one or more computing devices configured with computer-executable instructions, the method comprising:
acquiring, from a user interface, a user request for program information from a first external apparatus;
acquiring first metadata of a plurality of programs from a second external apparatus via the Internet;
transmitting the user request to the first external apparatus via a wireless network;
receiving, from the first external apparatus, a channel identifier of a program currently being displayed by the first external apparatus, and second metadata of the program currently being displayed by the first external apparatus, wherein the second metadata is received at the first external apparatus along with the program currently being displayed by the first external apparatus;
extracting, from the acquired first metadata, third metadata of a program associated with (i) a channel indicated by the received channel identifier and (ii) a current time point;
extracting, from the acquired first metadata, fourth metadata of a program immediately preceding in time the program indicated by the third metadata;
comparing the second metadata with the third metadata in response to the user request; and
if the third metadata corresponds to the second metadata, outputting first program information that is based on the third metadata, and
if the second metadata does not correspond to the extracted third metadata, outputting second program information that is based on the fourth metadata.

6. The method of claim 5, wherein the current time point corresponds to a time at which the second metadata is received from the first external apparatus.

7. The method of claim 6,
wherein if the third metadata corresponds to the second metadata, the first program information includes a keyword for a program indicated by the third metadata, and
wherein if the second metadata does not correspond to the third metadata, the second program information includes a keyword for a program indicated by the fourth metadata.

8. The method of claim 5, further comprising:
acquiring, from the second external apparatus, an address of a web page related to a program indicated by the third metadata and an address of a web page related to a program indicated by the fourth metadata,
wherein if the third metadata corresponds to the second metadata, the first program information includes a first image through which access is made to the address of the web page related to the program indicated by the third metadata, and
wherein if the second metadata does not correspond to the third metadata, the second program information includes a second image through which access is made to the address of the web page related to the program indicated by the fourth metadata.

* * * * *